US011989953B1

(12) United States Patent
Miyagawa et al.

(10) Patent No.: US 11,989,953 B1
(45) Date of Patent: May 21, 2024

(54) METHOD AND SYSTEM FOR VISUALIZING CONDITION LEVELS RELATED TO ROAD

(71) Applicant: Miyagawa Kogyo Co., Ltd., Tokyo (JP)

(72) Inventors: Satoshi Miyagawa, Tokyo (JP); Kazuo Ishii, Tokyo (JP); Shinobu Okino, Tokyo (JP)

(73) Assignee: Miyagawa Kogyo Co., Ltd., Tokyo (JP)

( * ) Notice: Subject to any disclaimer, the term of this patent is extended or adjusted under 35 U.S.C. 154(b) by 0 days.

(21) Appl. No.: 18/416,789

(22) Filed: Jan. 18, 2024

(51) Int. Cl.
*G06V 20/56* (2022.01)
*G06T 7/00* (2017.01)
*G06V 20/58* (2022.01)

(52) U.S. Cl.
CPC .......... *G06V 20/588* (2022.01); *G06T 7/0002* (2013.01); *G06V 20/58* (2022.01); *G06T 2207/10016* (2013.01); *G06T 2207/10024* (2013.01); *G06T 2207/30256* (2013.01)

(58) Field of Classification Search
CPC ......... G06T 7/0002; G06T 2207/10016; G06T 2207/10024; G06T 2207/3025; G06V 20/56; G06V 20/58; G06V 20/588; B64U 2101/30; G01C 21/32; G01C 21/3461; G01C 21/3822
USPC ...................................................... 382/103
See application file for complete search history.

(56) References Cited

U.S. PATENT DOCUMENTS

| | | | |
|---|---|---|---|
| 9,863,928 B1* | 1/2018 | Peterson | G01N 33/42 |
| 11,823,368 B1* | 11/2023 | Mohammad | G06T 7/0004 |
| 2010/0097455 A1* | 4/2010 | Zhang | G06V 20/588 |
| | | | 701/25 |
| 2015/0172582 A1* | 6/2015 | Kiyohara | H04N 23/00 |
| | | | 348/322 |
| 2021/0004363 A1* | 1/2021 | Bailly | G06T 17/05 |

FOREIGN PATENT DOCUMENTS

| | | |
|---|---|---|
| JP | 2018-178549 A | 11/2018 |
| JP | 2022090169 A | 6/2022 |
| JP | 2023-30775 A | 3/2023 |

* cited by examiner

*Primary Examiner* — Kenny A Cese
(74) *Attorney, Agent, or Firm* — Myers Wolin, LLC (57) ABSTRACT

A method may include: capturing, by a camera on a travelling vehicle, a plurality of road images of a road; selecting, by processor circuitry, a plurality of diagnostic images from the plurality of road images; determining, by the processor circuitry, a condition level of a diagnostic target feature in each of two or more of the plurality of selected diagnostic images; and visualizing. The visualizing may include one diagnostic image of the plurality of selected diagnostic images. The one diagnostic image may show one diagnostic target feature of the plurality of the diagnostic target features. The visualizing may include a map showing the road and showing the condition levels along the road.

14 Claims, 9 Drawing Sheets

| Image No. | Diagnostic Target Feature | Condition Value | Condition Level |
|---|---|---|---|
| 1 | Right Line | 88.6% | Bad |
| 1 | Left Line | 78.8% | Bad |
| 2 | Right Line | 89.5% | Bad |
| 2 | Left Line | 69.7% | Bad |
| 3 | Right Line | 55.6% | Bad |
| 3 | Left Line | 80.9% | Bad |
| 4 | Right Line | 33.8% | Medium |
| 4 | Left Line | 74.2% | Bad |
| 5 | Right Line | 23.0% | Medium |
| 5 | Left Line | 74.4% | Bad |
| 6 | Right Line | 9.0% | Good |
| 6 | Left Line | 46.0% | Medium |

METHOD AND SYSTEM FOR VISUALIZING CONDITION LEVELS RELATED TO ROAD

FIELD

The present disclosure generally relates to method and system visualizing condition levels related to a road, for example, wearing levels of a road section line.

BACKGROUND

Roads, which are used for vehicles to travel, require maintenance. As an example, road section lines are painted on roads, and road section lines may become worn due to various reasons. In some instances, the degree of wearing of the road section lines is examined, such that the lines are repaired in accordance with the degree of the wearing.

The description provided in the background section should not be assumed to be prior art merely because it is mentioned in or associated with the background section. The background section may include information that describes one or more aspects of the subject technology.

SUMMARY

One embodiment of the present disclosure may provide a method. The method may include: capturing, by a camera on a travelling vehicle, a plurality of road images of a road; selecting, by processor circuitry, a plurality of diagnostic images from the plurality of road images; determining, by the processor circuitry, a condition level of a diagnostic target feature in each of two or more of the plurality of selected diagnostic images; and visualizing. The visualizing may include one diagnostic image of the plurality of selected diagnostic images. The one diagnostic image may show one diagnostic target feature of the plurality of the diagnostic target features. The visualizing may include a map showing the road and showing the condition levels along the road.

Another embodiment of the present disclosure may provide a system. The system may include a memory that stores a plurality of instructions, and processor circuitry that is coupled to the memory. The processor circuitry may be configured to execute the plurality of instructions to: select a plurality of diagnostic images from a plurality of road images of a road, wherein the plurality of road images are captured by a camera on a travelling vehicle; determine a condition level of a diagnostic target feature in each of two or more of the plurality of selected diagnostic images; and visualize: one diagnostic image of the plurality of selected diagnostic images, the one diagnostic image showing one diagnostic target feature of the plurality of the diagnostic target features; and a map showing the road and showing the condition levels along the road.

Another embodiment of the present disclosure may provide a non-transitory computer-readable medium for storing executable instructions, which cause a method to be performed. The method may include: capturing, by a camera on a travelling vehicle, a plurality of road images of a road; selecting, by processor circuitry, a plurality of diagnostic images from the plurality of road images; determining, by the processor circuitry, a condition level of a diagnostic target feature in each of two or more of the plurality of selected diagnostic images; and visualizing. The visualizing may include one diagnostic image of the plurality of selected diagnostic images. The one diagnostic image may show one diagnostic target feature of the plurality of the diagnostic target features. The visualizing may include a map showing the road and showing the condition levels along the road.

EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 1:
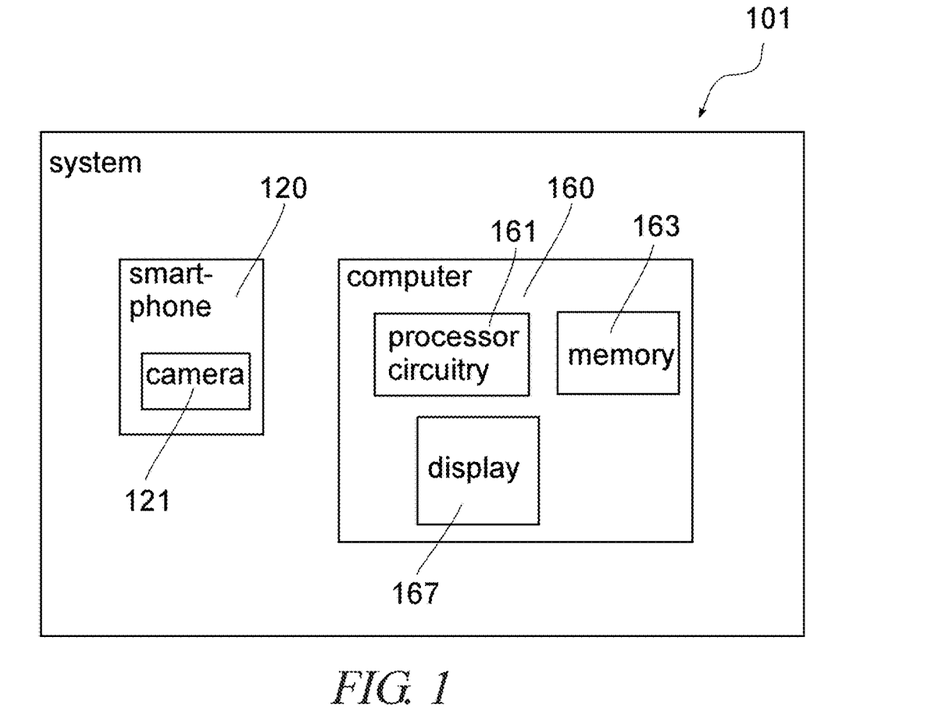
FIG. 1 illustrates a block diagram of a system according to one embodiment of the present disclosure.
Figure 2:
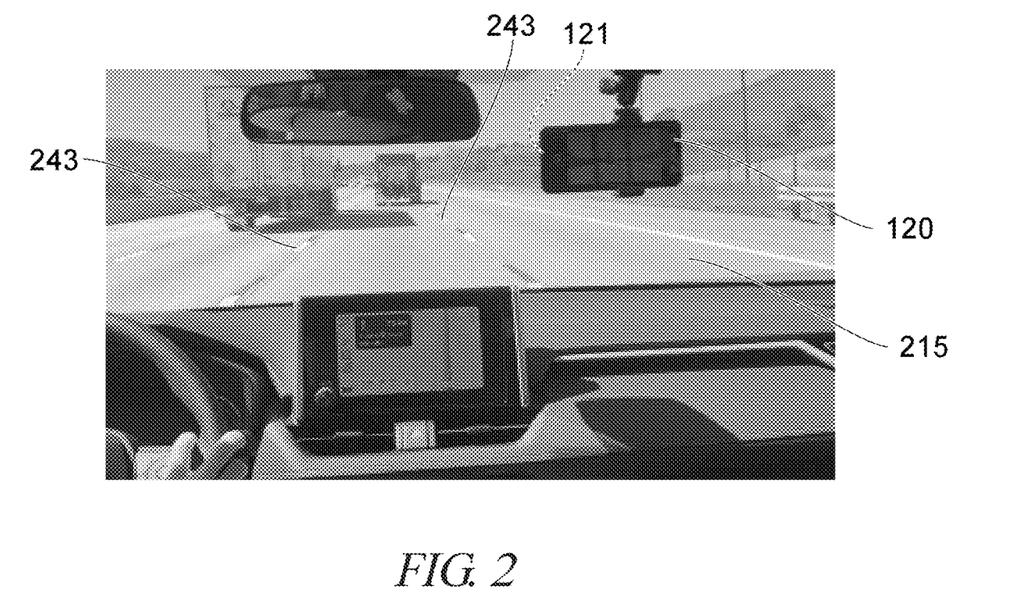
FIG. 2 illustrates use of a system according to one embodiment of the present disclosure.

FIG. 1 illustrates a block diagram of a system according to one embodiment of the present disclosure. FIG. 2 illustrates use of a system according to one embodiment of the present disclosure.

With reference to FIG. 1, in some embodiments, a system 101 may include a smartphone 120 and a computer 160. The smartphone 120 may include a camera 121 and a GPS (Global Positioning System). The smartphone 120 may be mounted on a vehicle. In some embodiments, as shown in FIG. 2, the smartphone 120 may be held by a holder that includes a suction cup and may be attached to a stand of the vehicle so as to face the windshield of the vehicle. The smartphone 120 may include software for capturing a plurality of road images of a road 215. In some embodiments, the camera 121 may be mounted on the vehicle to capture the road images to capture target features 243 to be diagnosed. The diagnostic target features 243 may include at least one of a road section line, a cross walk line, and a pothole, but are not limited to these examples, and may be any other features that can be diagnosed.

With reference to FIG. 1, the computer 160 may include processor circuitry 161 and a memory 163. The memory 163 may store a plurality of instructions in the form of software. The processor circuitry 161 may be coupled to the memory 163 and may be configured to execute the plurality of instructions to perform processes. The computer 160 may further include a display 167. The computer 160 may be a laptop computer, a desktop computer, or any other computer(s) that can perform processes in this disclosure.

Figure 3A:
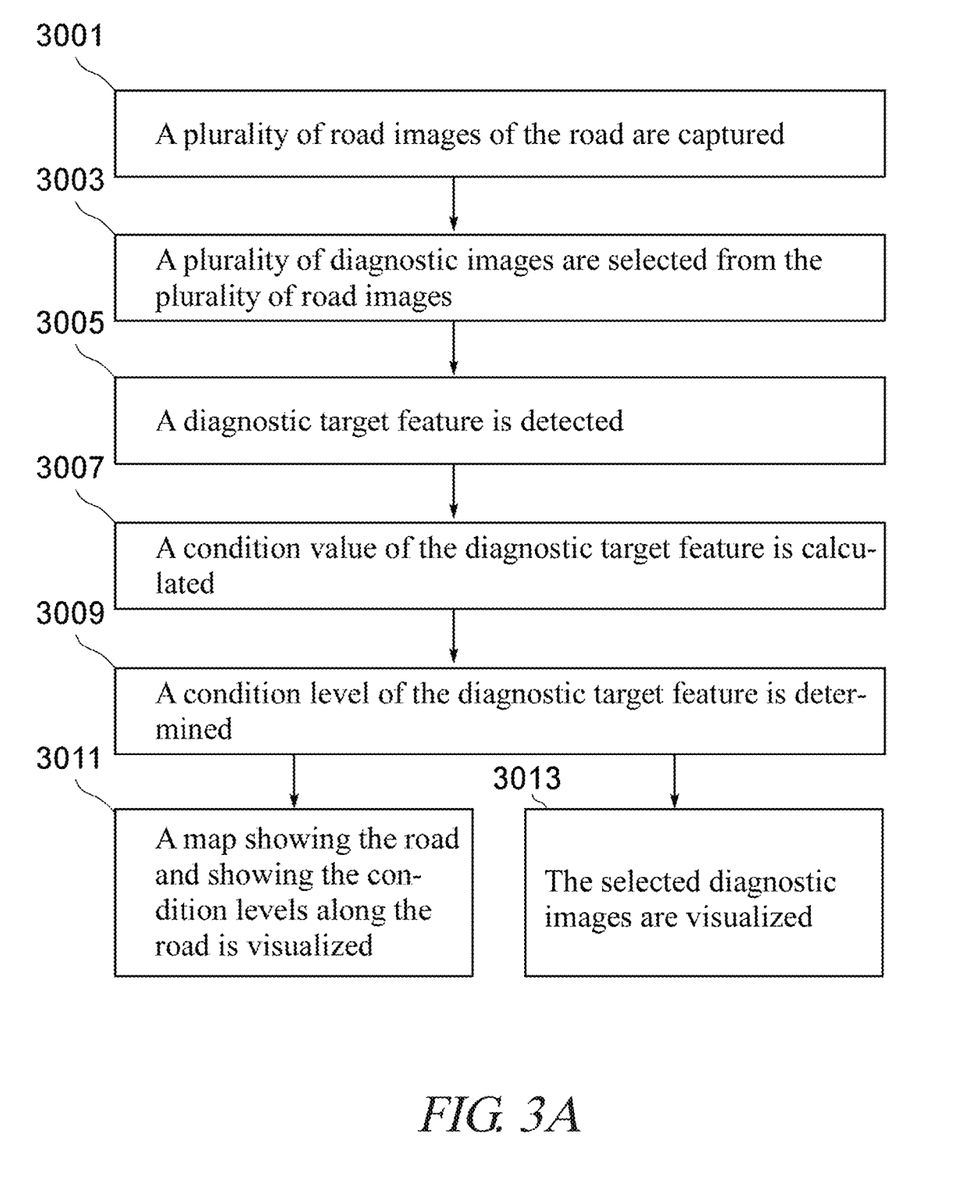
FIG. 3A illustrates a flowchart of a method according to one embodiment.
Figure 3B:
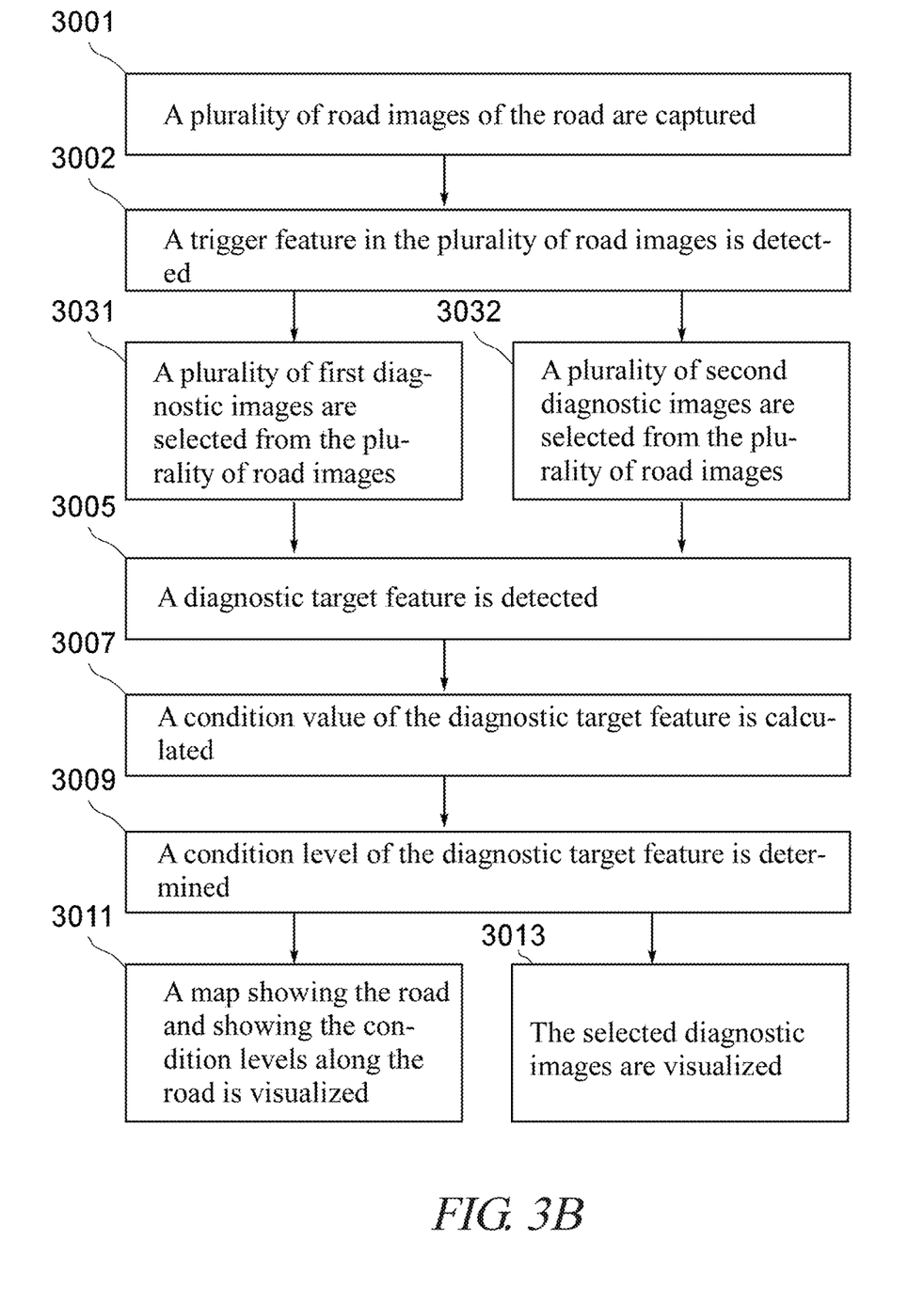
FIG. 3B illustrates a flowchart of another method according to one embodiment.

FIG. 3A illustrates a flowchart of a method according to one embodiment. FIG. 3B illustrates a flowchart of another method according to one embodiment. The same or similar processes in FIGS. 3A and 3B are referenced with the same reference numerals.

A travelling route for a vehicle may be planned prior to capturing a plurality of road images. In 3001 (see FIG. 3A), when the vehicle is travelling, the camera 121 on a travelling vehicle may capture a plurality of road images 210 (see FIG. 4A) of the road 215. The capturing of the images 210 may include capturing, along the road 215, a plurality of moving images of the road 215 (i.e., capturing along the road 215 a video of the road 215) and/or capturing, along the road 215, a plurality of still images of the road 215. In some embodiments, the road images 210 may be captured at photographic time intervals that are between 5 msec and 500 msec. In some embodiments, the photographic time intervals may be between 10 msec and 100 msec. In some examples, the photographic time intervals may be constant. Each of the plurality of road images 210 may be associated with (e.g., tagged with) geolocation information of a location at which the corresponding road image 210 is captured. The geolocation information may be obtained by the GPS of the smartphone 120. In some embodiments, geolocation information may be obtained and recorded in association with a series of the road images 210 (e.g., video images) at a constant time interval, and each road image 210 may be associated with respective geolocation information by interpolating geolocation information of each road image 210.

The interpolation may be performed by assuming that the vehicle travels at the same speed within each time interval. In other embodiments, capturing a plurality of road images may be conducted by a camera (e.g., a camera of a tablet computer, a camera originally installed on a vehicle, or a traditional video camera) other than the camera 121 of the smartphone 120.

In some embodiments, the camera 121 may capture a trigger feature 280 (see FIG. 4A) in the road images 210. The trigger feature 280 may be used in 3002 of FIG. 3B. The trigger feature 280 may include at least one of a road section line, a traffic sign, a road marking, a cross walk, a fire hydrant, a traffic signal, and a street light, but is not limited to these examples.

In some embodiments, after completion of capturing the road images 210 (in 3001 in FIGS. 3A and 3B), and/or during capturing the road images 210 (in 3001 in FIGS. 3A and 3B), processes in and after 3003 in FIG. 3A and processes in and after 3002 in FIG. 3B may be performed. In some embodiments, these processes may be performed by the processor circuitry 161 of the computer 160, but may be performed by processor circuitry in another computer, such as a cloud computer. The processes may be performed in the same computer, or different computers.

Figure 4A:
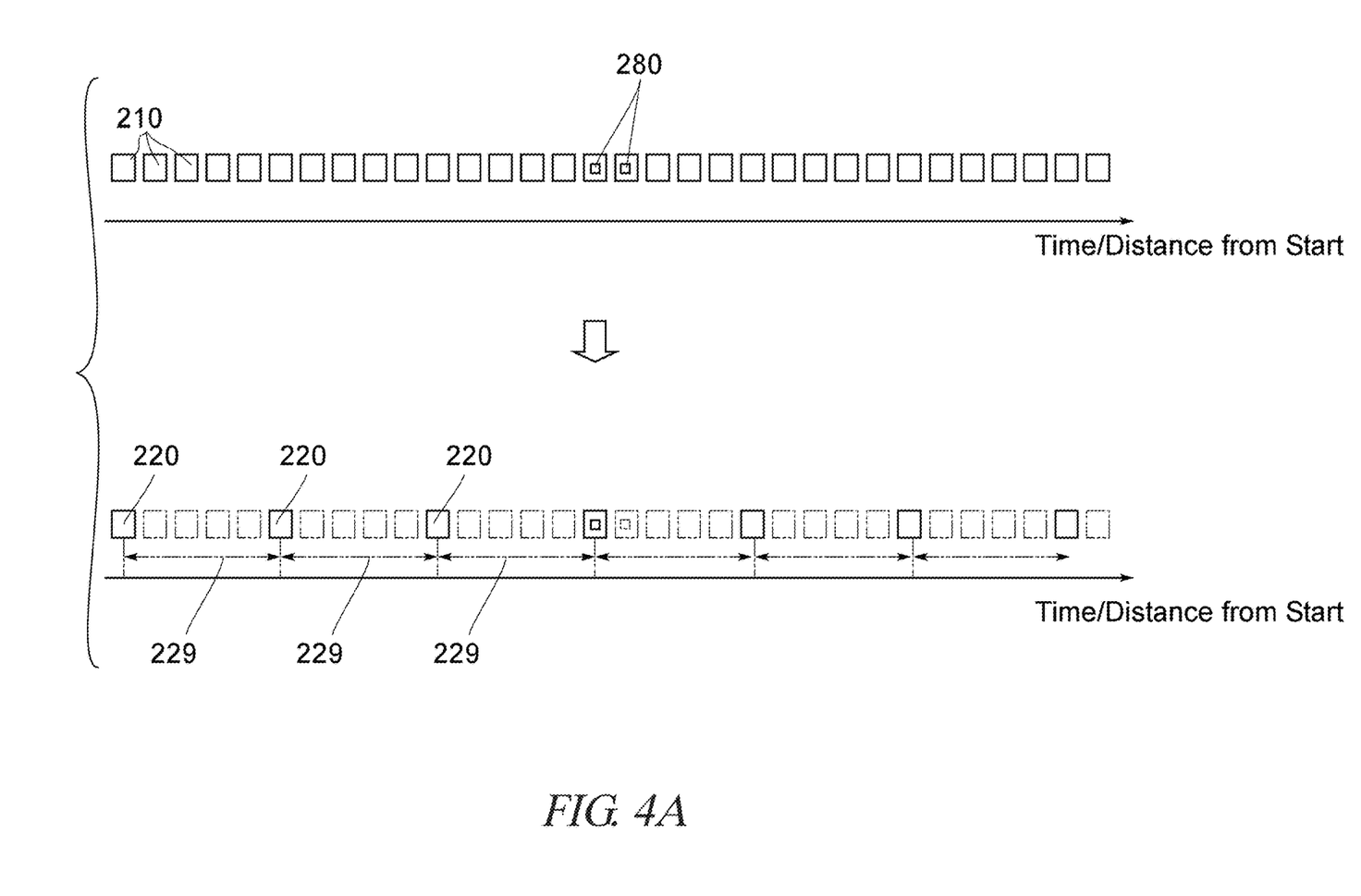
FIG. 4A illustrates a schematic view of a plurality of captured road images according to one embodiment.

With reference to FIGS. 3A and 4A, in 3003 (see FIG. 3A), a plurality of diagnostic images 220 to be diagnosed may be selected from the plurality of road images 210. The diagnostic images 220 may correspond to images that are captured at distance intervals 229 along the road 215. The distance intervals 229 may be, for example, between 0.5 meters and 50 meters. Selecting the diagnostic images 220 corresponding to images at the distance intervals 229 may use geolocation information (e.g., latitude and longitude GPS coordinates) of the road images. The distance intervals 229 may be substantially the same, and each of the distance intervals 229 may be a predetermined distance plus a value within 10 percents of the predetermined distance. The value of the distance intervals 229 may be predetermined, for example, by the user, before the process of 3003.

In other embodiments, in 3002 (see FIG. 3B), a trigger feature 280 in the plurality of road images 210 may be detected. The detection of the trigger feature 280 may be performed automatically by specific software using AI (Artificial Intelligence). As described above, the trigger feature 280 may include at least one of a road section line, a traffic sign, a road marking, a cross walk, a fire hydrant, a traffic signal, and a street light. In some embodiments, selecting of the diagnostic images 220 may include selecting based on the detected trigger feature 280.

Figure 4B:
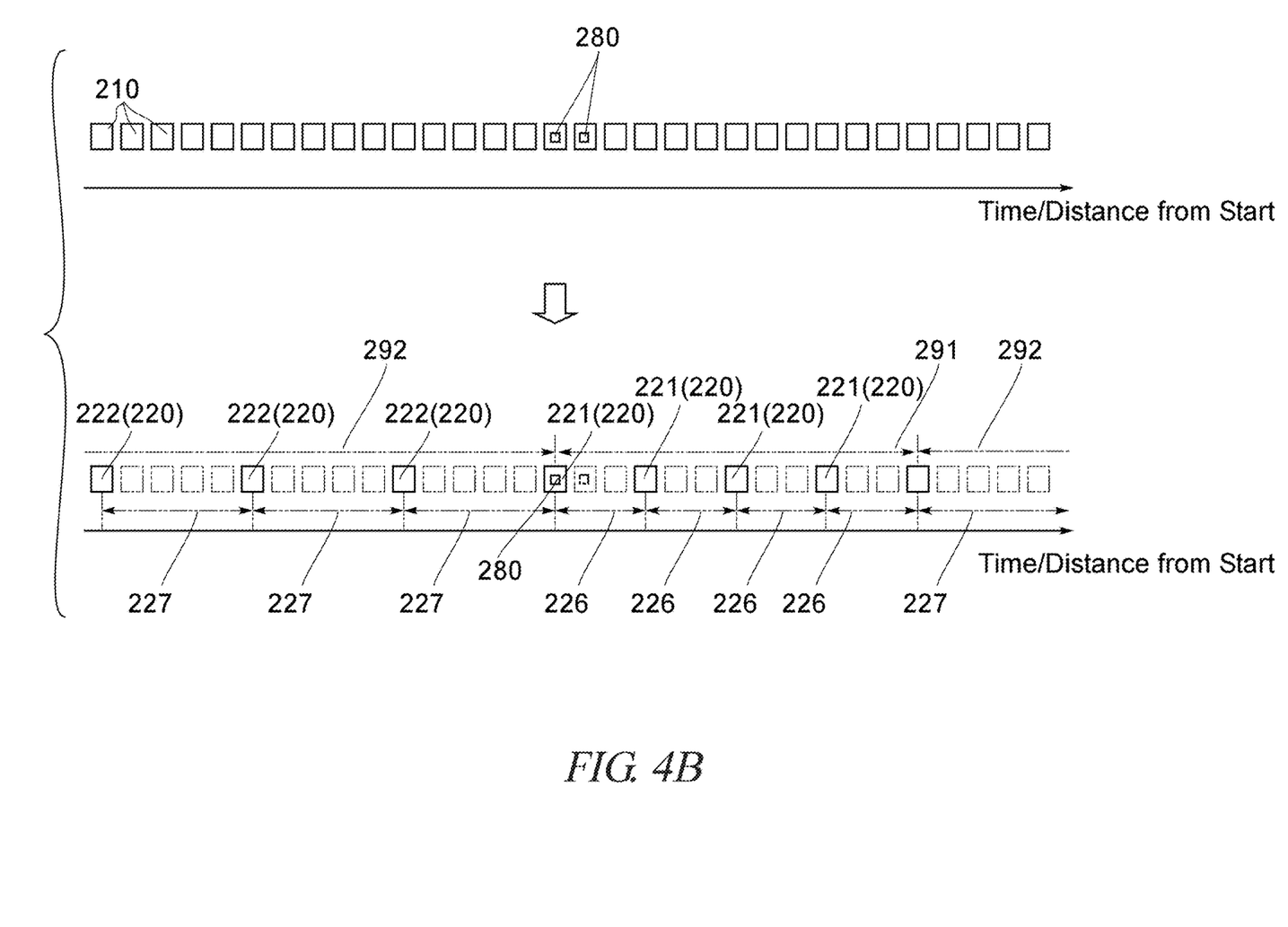
FIG. 4B illustrates a schematic view of a plurality of selected diagnostic images according to one embodiment.

With reference to FIGS. 3B and 4B, in some embodiments, selecting of the diagnostic images 220 may include selecting, from the road images 210, a plurality of first diagnostic images 221 (see 3031 in FIG. 3B), and selecting, from the road images 210, a plurality of second diagnostic images 222 (see 3032 in FIG. 3B). With reference to FIG. 4B, the first diagnostic images 221 may correspond to images that are captured at first distance intervals 226 along the road 215. The first distance intervals 226 may be, for example, between 0.5 meters and 20 meters. In some embodiments, the first diagnostic images 221 may be selected based on the trigger feature 280. Selecting the first diagnostic images 221 corresponding to images at the first distance intervals 226 may use geolocation information (e.g., latitude and longitude GPS coordinates) of the road images. In some embodiments, the first distance intervals 226 may be substantially the same, and each of the first distance intervals 226 may be a predetermined first distance plus a value within 10 percents of the predetermined first distance. The value of the first distance intervals 226 may be predetermined, for example, by the user, before the process of 3003.

With reference to FIG. 4B, the second diagnostic images 222 may correspond to images that are captured at second distance intervals 227 along the road 215. The first distance intervals 226 may be, for example, between 30 meters and 50 meters. The second diagnostic images 222 may be selected not based on the trigger feature 280. Each of the second distance intervals 227 may be greater than each of the first distance intervals 226. Selecting the second diagnostic images 222 corresponding to images at the second distance intervals 227 may use geolocation information (e.g., latitude and longitude GPS coordinates) of the road images. In some embodiments, the second distance intervals 227 may be substantially the same, and each of the second distance intervals 227 may be a predetermined second distance plus a value within 10 percents of the predetermined second distance. The value of the second distance intervals 227 may be predetermined, for example, by the user, before the process of 3003.

With reference to FIG. 4B, in some examples, the first diagnostic images 221 may be selected from the road images 210 in a road section 291 of the road 251, where the road section 291 includes the trigger feature 280 (e.g., a road section line). The second diagnostic images 222 may be selected from the road images 210 in a road section(s) 292 of the road 251, where the road section 292 does not include the trigger feature 280 (e.g., a road section line).

Figure 5:
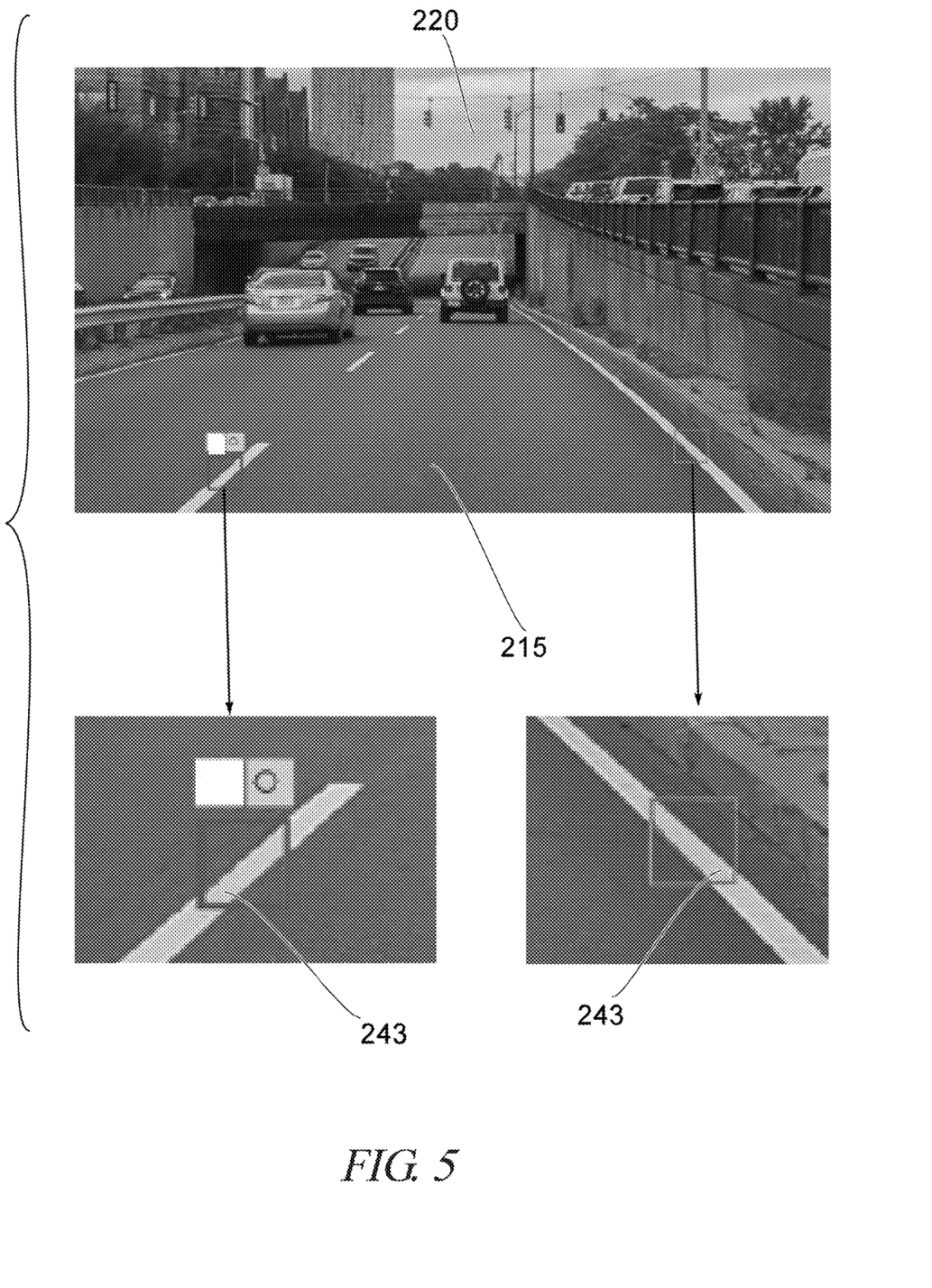
FIG. 5 illustrates diagnostic images according to one embodiment.

Then, with reference to FIGS. 3A and 5, in 3005 (see FIG. 3A), a diagnostic target feature 243 (e.g., a road section line, a cross walk line, and a pothole) in each of two or more of the plurality of diagnostic images 220 may be detected. The detection of the diagnostic target feature 243 may be performed automatically by specific software using AI (Artificial Intelligence). Process in and after 3003 in FIG. 3A may be the same as processes in and after 3003 in FIG. 3B.

Figure 6:
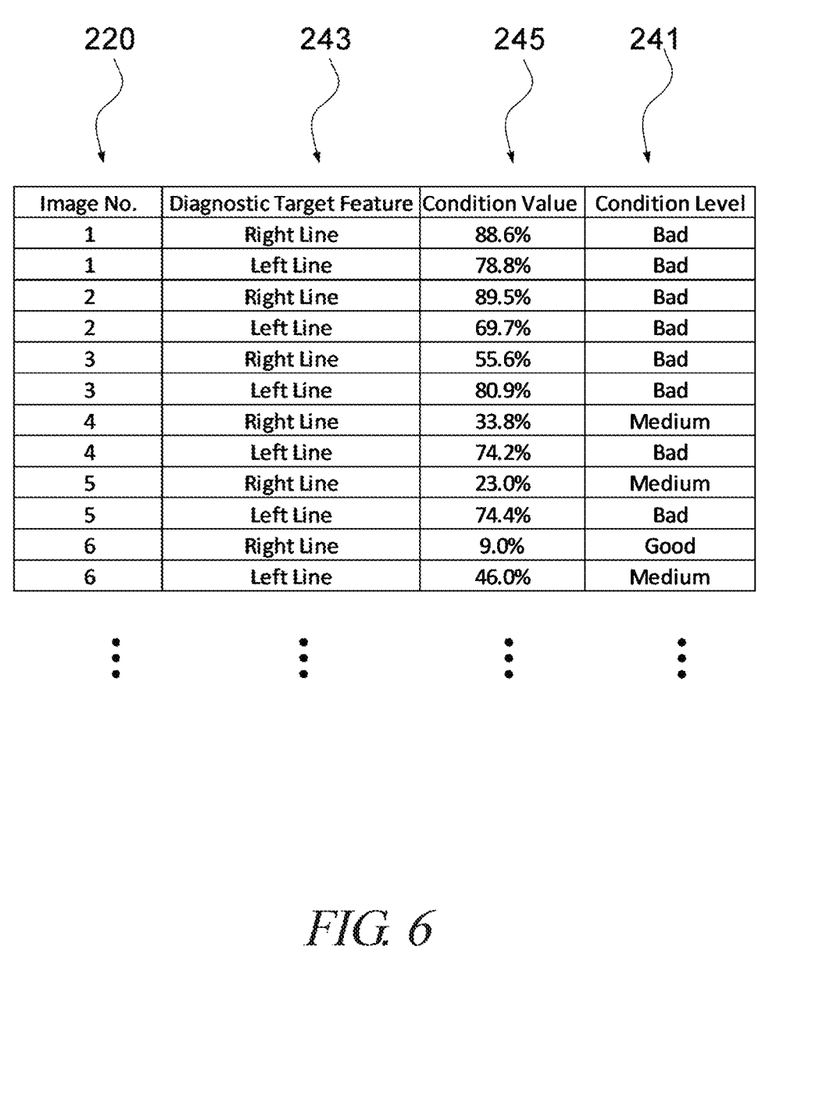
FIG. 6 illustrates a table for determining a condition level according to one embodiment.

Then, with reference to FIGS. 3A and 6, in 3007 (see FIG. 3A), a condition value 245 of each of the diagnostic target features 243 may be calculated. As an example, the condition value 245 to be calculated may be a value related to a wearing level (e.g., wearing degree) of a road section line. The value may be a ratio of an actual white or yellow area of a section line relative to an original area of the section line. A method for calculating the condition value 245 is not be limited to this example, and other methods may be used.

Then, with reference to FIGS. 3A and 6, in 3009 (see FIG. 3A), a condition level 241 of each of the diagnostic target features 243 may be determined. In some embodiments, each calculated condition value 245 (e.g., wearing ratio) may be classified into one condition level 241 of a plurality of condition levels 241. For example, each condition value 245 may be classified into one of a first condition level (good), a second condition level (medium), and a third condition level (bad), by using one or more thresholds. The number of the condition levels is not limited to three, and may be any other numbers, such as 2, 4, 5, and 6.

Figure 7:
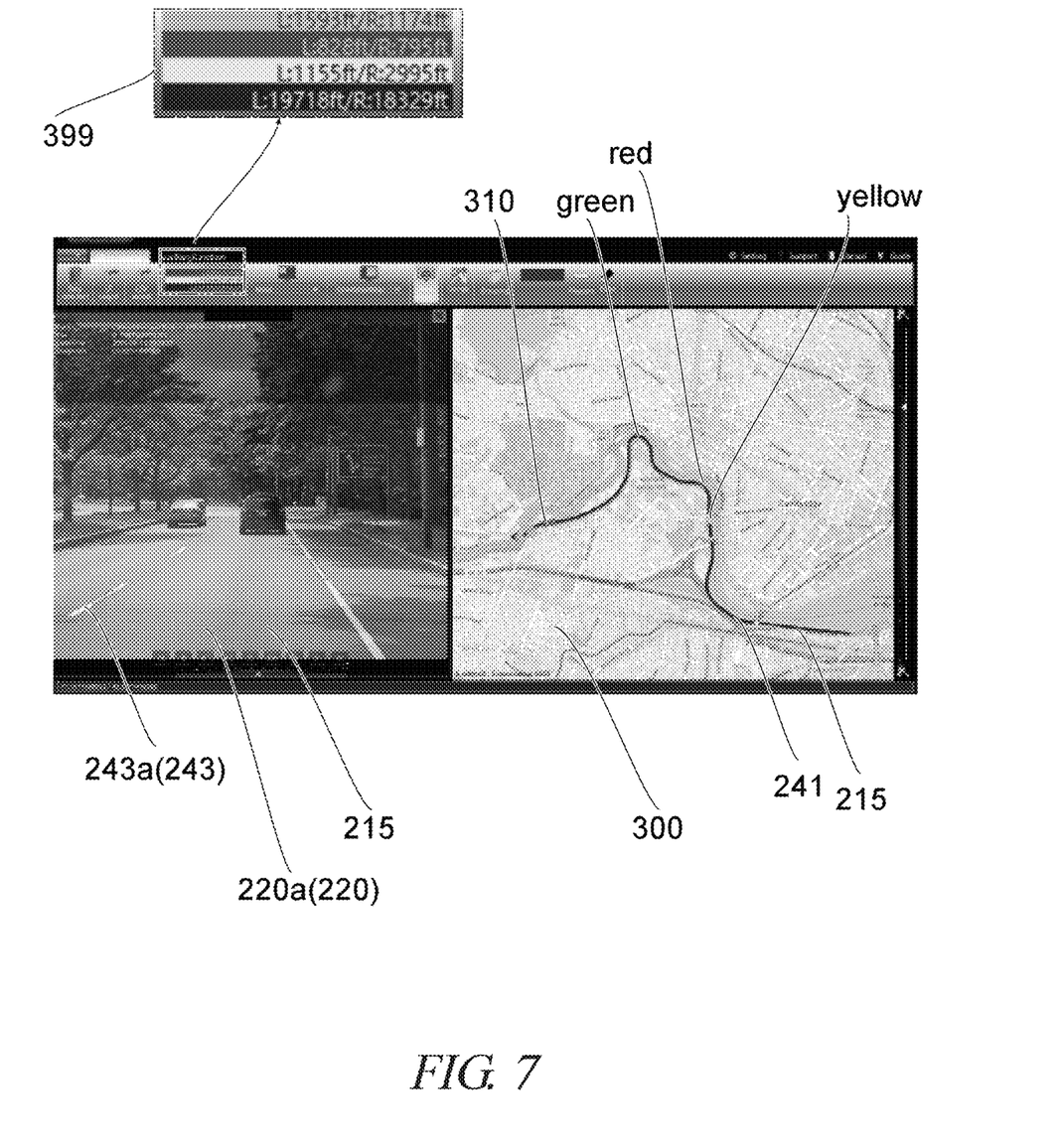
FIG. 7 illustrates a visualized map and a diagnostic image according to one embodiment.

Then, with reference to FIGS. 3A and 7, in 3011 (see FIG. 3A), a map 300 showing the road 215 and showing the condition levels 241 along the road 215 may be visualized, for example, on the display 167 of the computer 160. In some embodiments, the condition levels 241 may be visualized in corresponding colors (e.g., red for a bad level, yellow for a medium level, and green for a good level) on the map 300 on the display 167. In some embodiments, in 3013 (see 3A), on the same display 167 or another different from display 167, the plurality of selected diagnostic images 220 may be visualized. One diagnostic image 220a of the plurality of selected diagnostic images 220 and the map 300 may be shown at the same time. The diagnostic image 220a may show one diagnostic target feature 243a, which has been diagnosed, of the plurality of the diagnostic target features 243. On the map 300, a location of the road that is shown in the diagnostic image may be shown by an indication 310. The visualization of the condition levels along the road may be used for maintenance of the road (e.g., preparing work instructions for repainting a road section line, and maintenance planning).

Furthermore, in some examples, when the diagnostic target feature 243 is a road section line, the condition levels 400 may be visualized with a length(s) of the corresponding section of the road section line. FIG. 7 (see box 399) shows a total length, of the corresponding condition level, of a right section line of the road of, and shows a total length, of the corresponding condition level, of a left section line of the road. In some embodiments, on the map 300, wearing levels of a plurality of cross roads may be displayed.

Figure 8:
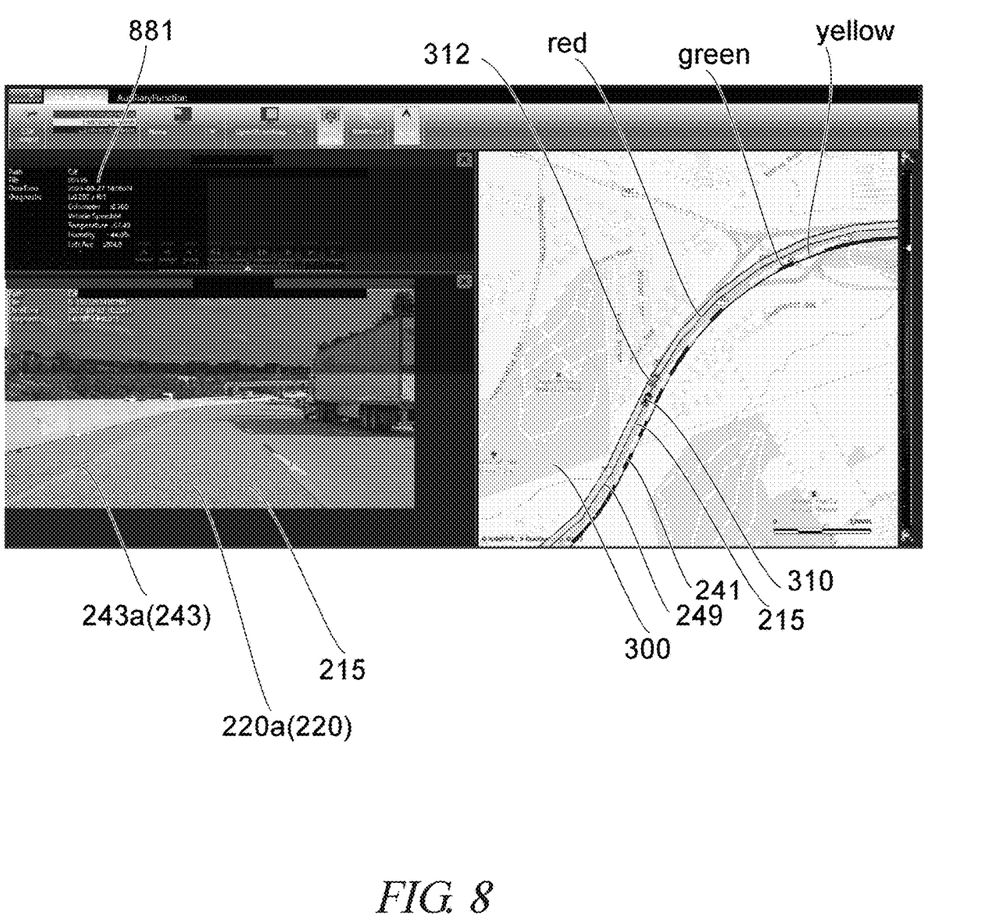
FIG. 8 illustrates a visualized map and a diagnostic image according to another embodiment.

In other embodiments, as shown in FIG. 8, on the map 300, luminance levels 249 (by using red, yellow, and green, for example), along the road 215, of light that is reflected from a road section line of the road 215 may be displayed in addition to the condition levels 241 of the road 215. On the map 300, a location of the road for which information 881 related to the luminance levels 249 is shown on the display may be shown by an indication 312. According to this embodiment, two types of levels may be realized by the user, which may be beneficial for planning for maintenance planning of the road section line.

According to some embodiments, a plurality of diagnostic images may be selected from the plurality of road images by the processor circuitry. Thus, more preferable diagnostic images may be effectively selected from the captured road images. In addition, selecting the diagnostic images may limit images to be diagnosed, and thus processing loads on a computer for obtaining the condition levels may be reduced.

According to some embodiments, a trigger feature in the plurality of road images may be detected. The selecting of the plurality of diagnostic images may include selecting based on the detected trigger feature. According to the embodiments, the selected diagnostic images may include a diagnostic target feature more reliably. Therefore, better visualization of the condition levels on the map may be realized.

According to some embodiments, a plurality of first diagnostic images may be selected from the road images. The plurality of first diagnostic images correspond to images that are captured at a first distance intervals along the road. The selecting of the plurality of the first diagnostic images is based on the trigger feature 280. In addition, a plurality of second diagnostic images may be selected from the road images. The plurality of second diagnostic images correspond to images that are captured at second distance intervals along the road. The selecting of the second diagnostic images is not based on the trigger feature 280. Each of the second distance intervals is greater than each of the first distance intervals. According to such embodiments, more detailed condition levels of diagnostic target features may be obtained for the first diagnostic images. In addition, selecting the second diagnostic images may result in less processing loads on a computer for obtaining the condition levels and/or a less processing time for obtaining the condition levels.

The methods according to the present disclosure may be implemented on a computer as a computer implemented method, or in dedicated hardware, or in a combination of both. Executable code for a method according to the present disclosure may be stored on a computer program product. Examples of computer program products include memory devices, optical storage devices, integrated circuits, servers, online software, etc. Preferably, the computer program product may include non-transitory program code stored on a computer readable medium for performing a method according to embodiments and equivalents, described herein, when said program product is executed on a computer. In an embodiment, the computer program may include computer program code adapted to perform all the steps of a method when the computer program is run on a computer. The computer program may be embodied on a computer readable medium.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Further, the disclosure includes examples according to the following clauses.

Clause 1. A method comprising:
  capturing, by a camera on a travelling vehicle, a plurality of road images of a road;
  selecting, by processor circuitry, a plurality of diagnostic images from the plurality of road images;
  determining, by the processor circuitry, a condition level of a diagnostic target feature in each of two or more of the plurality of selected diagnostic images; and
  visualizing:
    one diagnostic image of the plurality of selected diagnostic images, the one diagnostic image showing one diagnostic target feature of the plurality of the diagnostic target features; and
    a map showing the road and showing the condition levels along the road.

Clause 2. The method of claim 1, wherein the determining of the condition levels includes:
  detecting, by the processor circuitry, the diagnostic target feature in each of the two or more of the plurality of diagnostic images;
  calculating, by the processor circuitry, a condition value of each of the diagnostic target features; and
  classifying, by the processor circuitry, each calculated condition value into one condition level of a plurality of condition levels.

Clause 3. The method of Clause 2, wherein the condition value of the diagnostic target feature is a value related to wearing level of a road section line.

Clause 4. The method of any one of Clauses 1-3, wherein the selected plurality of diagnostic images correspond to images that are captured at distance intervals along the road, the distance intervals being between 0.5 meters and 50 meters.

Clause 5. The method of any one of Clauses 1-4, further comprising detecting a trigger feature in the plurality of road images, wherein the selecting of the plurality of diagnostic images includes selecting based on the detected trigger feature.

Clause 6. The method of Clause 5, wherein the selecting of the plurality of diagnostic images includes:
  selecting, from the road images, a plurality of first diagnostic images that correspond to images that are captured at a first distance intervals along the road, wherein the selecting of the plurality of the first diagnostic images is based on the trigger feature; and
  selecting, from the road images, a plurality of second diagnostic images that correspond to images that are captured at second distance intervals along the road, wherein the selecting of the second diagnostic images is not based on the trigger feature, wherein each of the second distance intervals is greater than each of the first distance intervals.

Clause 7. The method of any one of Clauses 5-6, wherein the trigger feature includes at least one of a road section line, a traffic sign, a road marking, a cross walk, a fire hydrant, a traffic signal, and a street light.

Clause 8. The method of any one of Clauses 1-7, wherein the condition level includes a wearing level of a road section line.

Clause 9. The method of any one of Clauses 1-8, wherein the capturing of the plurality of road images includes capturing the plurality of road images at photographic time intervals that are between 5 msec and 500 msec.

Clause 10. The method of any one of Clauses 1-9, wherein the capturing of the plurality of road images includes capturing a plurality of moving images of the road.

Clause 11. The method of any one of Clauses 1-10, wherein the diagnostic target feature includes at least one of a road section line, a cross walk line, and a pothole.

Clause 12. The method of any one of Clauses 1-11, wherein the condition levels are visualized in corresponding colors on the map.

Clause 13. The method of any one of Clauses 1-12, wherein the visualizing includes visualizing on the map luminance levels, along the road, of light that is reflected from a road section line of the road.

Clause 14. The method of any one of Clauses 1-13, wherein the one diagnostic image of the plurality of selected diagnostic images, and the map are shown at a same time.

Clause 15. A system, comprising:
  a memory that stores a plurality of instructions;
  processor circuitry that is coupled to the memory and is configured to execute the plurality of instructions to:
    select a plurality of diagnostic images from a plurality of road images of a road, wherein the plurality of road images are captured by a camera on a travelling vehicle;
    determine a condition level of a diagnostic target feature in each of two or more of the plurality of selected diagnostic images; and visualize:
one diagnostic image of the plurality of selected diagnostic images, the one diagnostic image showing one diagnostic target feature of the plurality of the diagnostic target features; and
a map showing the road and showing the condition levels along the road.

Clause 16. A non-transitory computer-readable medium for storing executable instructions, which cause a method to be performed, the method comprising:
capturing, by a camera on a travelling vehicle, a plurality of road images of a road; selecting, by processor circuitry, a plurality of diagnostic images from the plurality of road images;
determining, by the processor circuitry, a condition level of a diagnostic target feature in each of two or more of the plurality of selected diagnostic images; and
visualizing:
one diagnostic image of the plurality of selected diagnostic images, the one diagnostic image showing one diagnostic target feature of the plurality of the diagnostic target features; and
a map showing the road and showing the condition levels along the road.

What is claimed is:

1. A method comprising:
capturing, by a camera on a travelling vehicle, a plurality of road images of a road;
selecting, by processor circuitry, a plurality of diagnostic images from the plurality of road images;
determining, by the processor circuitry, a condition level of a diagnostic target feature in each of two or more of the plurality of selected diagnostic images; and
visualizing:
one diagnostic image of the plurality of selected diagnostic images, the one diagnostic image showing one diagnostic target feature of the plurality of the diagnostic target features; and
a map showing the road and showing the condition levels along the road,
wherein the method further comprises detecting a trigger feature in the plurality of road images, and the selecting of the plurality of diagnostic images includes selecting based on the detected trigger feature, and
wherein the selecting of the plurality of diagnostic images includes:
selecting, from the road images, a plurality of first diagnostic images that correspond to images that are captured at a first distance intervals along the road wherein the selecting of the plurality of the first diagnostic images is based on the trigger feature; and
selecting, from the road images, a plurality of second diagnostic images that correspond to images that are captured at second distance intervals along the road, wherein the selecting of the second diagnostic images is not based on the trigger feature, wherein each of the second distance intervals is greater than each of the first distance intervals.

2. The method of claim 1, wherein the determining of the condition levels includes:
detecting, by the processor circuitry, the diagnostic target feature in each of the two or more of the plurality of diagnostic images;
calculating, by the processor circuitry, a condition value of each of the diagnostic target features; and
classifying, by the processor circuitry, each calculated condition value into one condition level of a plurality of condition levels.

3. The method of claim 2, wherein the condition value of the diagnostic target feature is a value related to wearing level of a road section line.

4. The method of claim 1, wherein the selected plurality of diagnostic images correspond to images that are captured at distance intervals along the road, the distance intervals being between 0.5 meters and 50 meters.

5. The method of claim 1, wherein the trigger feature includes at least one of a road section line, a traffic sign, a road marking, a cross walk, a fire hydrant, a traffic signal, and a street light.

6. The method of claim 1, wherein the condition level includes a wearing level of a road section line.

7. The method of claim 1, wherein the capturing of the plurality of road images includes capturing the plurality of road images at photographic time intervals that are between 5 msec and 500 msec.

8. The method of claim 1, wherein the capturing of the plurality of road images includes capturing a plurality of moving images of the road.

9. The method of claim 1, wherein the diagnostic target feature includes at least one of a road section line, a cross walk line, and a pothole.

10. The method of claim 1, wherein the condition levels are visualized in corresponding colors on the map.

11. The method of claim 1, wherein the visualizing includes visualizing on the map luminance levels, along the road, of light that is reflected from a road section line of the road.

12. The method of claim 1, wherein the one diagnostic image of the plurality of selected diagnostic images, and the map are shown at a same time.

13. A system, comprising:
a memory that stores a plurality of instructions;
processor circuitry that is coupled to the memory and is configured to execute the plurality of instructions to:
detect a trigger feature in a plurality of road images of a road, wherein the plurality of road images are captured by a camera on a traveling vehicle;
select a plurality of diagnostic images from the plurality of road images;
determine a condition level of a diagnostic target feature in each of two or more of the plurality of selected diagnostic images; and
visualize:
one diagnostic image of the plurality of selected diagnostic images, the one diagnostic image showing one diagnostic target feature of the plurality of the diagnostic target features; and
a map showing the road and showing the condition levels along the road,
wherein the selecting of the plurality of diagnostic images includes selecting based on the detected trigger feature, and
wherein the selecting of the plurality of diagnostic images includes:
selecting, from the road images, a plurality of first diagnostic images that correspond to images that are captured at a first distance intervals along the road wherein the selecting of the plurality of the first diagnostic images is based on the trigger feature; and
selecting, from the road images, a plurality of second diagnostic images that correspond to images that are captured at second distance intervals along the road, wherein the selecting of the second diagnostic images is not based on the trigger feature wherein each of the second distance intervals is greater than each of the first distance intervals.

14. A non-transitory computer-readable medium for storing executable instructions, which cause a method to be performed, the method comprising:

capturing, by a camera on a travelling vehicle, a plurality of road images of a road;

selecting, by processor circuitry, a plurality of diagnostic images from the plurality of road images;

determining, by the processor circuitry, a condition level of a diagnostic target feature in each of two or more of the plurality of selected diagnostic images; and     visualizing:

one diagnostic image of the plurality of selected diagnostic images, the one diagnostic image showing one diagnostic target feature of the plurality of the diagnostic target features; and         a map showing the road and showing the condition levels along the road, wherein the method further comprises detecting a trigger feature in the plurality of road images, and the selecting of the plurality of diagnostic images includes selecting based on the detected trigger feature, and wherein the selecting of the plurality of diagnostic images includes:

selecting, from the road images, a plurality of first diagnostic images that correspond to images that are captured at a first distance intervals along the road wherein the selecting of the plurality of the first diagnostic images is based on the trigger feature; and     selecting, from the road images, a plurality of second diagnostic images that correspond to images that are captured at second distance intervals along the road, wherein the selecting of the second diagnostic images is not based on the trigger feature wherein each of the second distance intervals is greater than each of the first distance intervals.

\* \* \* \* \*